US011820955B2

(12) United States Patent
Crow et al.

(10) Patent No.: US 11,820,955 B2
(45) Date of Patent: Nov. 21, 2023

(54) DISPERSANTS DERIVED FROM AROMATIC POLYAMINES, LUBRICANTS, AND METHODS

(71) Applicant: International Petroleum Products & Additives Company, Inc., Dublin, CA (US)

(72) Inventors: Jeffrey A. Crow, Midlothian, VA (US); Xingguo R. Chen, Henrico, VA (US); Troy R. Haynes, Midlothian, VA (US); Brennan William Balzer, Midlothian, VA (US); Brian Joseph Cereghino, Danville, VA (US)

(73) Assignee: International Petroleum Products & Additives Company, Inc., Dublin, CA (US)

( * ) Notice: Subject to any disclaimer, the term of this patent is extended or adjusted under 35 U.S.C. 154(b) by 4 days.

(21) Appl. No.: 17/683,302

(22) Filed: Feb. 28, 2022

(65) Prior Publication Data

US 2023/0313065 A1    Oct. 5, 2023

(51) Int. Cl.
*C10M 149/02* (2006.01)
*C08F 10/10* (2006.01)
*C10M 169/04* (2006.01)
*C10N 40/25* (2006.01)
*C10N 30/04* (2006.01)

(52) U.S. Cl.
CPC ............ *C10M 149/02* (2013.01); *C08F 10/10* (2013.01); *C10M 169/041* (2013.01); *C08F 2810/00* (2013.01); *C10M 2203/003* (2013.01); *C10M 2217/06* (2013.01); *C10N 2030/041* (2020.05); *C10N 2040/25* (2013.01)

(58) Field of Classification Search
CPC ............ C10M 149/02; C10M 169/041; C10M 2203/003; C10M 2217/06; C08F 10/10; C08F 2810/00; C10N 2030/041; C10N 2040/25
See application file for complete search history.

(56) References Cited

U.S. PATENT DOCUMENTS

| 3,622,514 A * | 11/1971 | Dickert, Jr. ........ C07D 207/404 |
| | | 508/288 |
| 3,773,787 A | 11/1973 | Dickert, Jr. et al. |
| 7,361,629 B2 | 4/2008 | Loper et al. |
| 7,863,338 B2 | 4/2011 | Becker et al. |
| 2005/0039381 A1* | 2/2005 | Langer ................. C10L 1/328 |
| | | 44/302 |
| 2007/0232504 A1 | 10/2007 | Goyal et al. |
| 2008/0103074 A1 | 5/2008 | Stokes et al. |
| 2008/0103076 A1 | 5/2008 | Ruhe et al. |
| 2017/0260365 A1* | 9/2017 | Liu ...................... C08L 35/00 |
| 2022/0364010 A1* | 11/2022 | Zhang ................ C10M 141/08 |

FOREIGN PATENT DOCUMENTS

| DE | 2045095 A1 | 3/1971 |
| EP | 1538193 A1 | 6/2005 |
| EP | 1574559 A1 | 9/2005 |
| EP | 1693434 A2 | 8/2006 |
| EP | 1916292 A1 | 4/2008 |
| WO | 2013123102 A2 | 8/2013 |
| WO | 2013165792 A1 | 11/2013 |
| WO | 2014185966 A1 | 11/2014 |
| WO | 2015042341 A1 | 3/2015 |
| WO | WO-2020260458 A1 * | 12/2020 .......... C10M 133/16 |

OTHER PUBLICATIONS

Novel Poly(succinimide-ether)s Based on the Reaction of Bismaleimides with Azomethine Bisphenols Camelia Hulubei; Vasile Cozan and M Bruma High Performance Polymers 16: 405-418 (2004) (Year: 2004).*

* cited by examiner

*Primary Examiner* — Cephia D Toomer
(74) *Attorney, Agent, or Firm* — Eversheds Sutherland (US) LLP

(57) ABSTRACT

Compositions, including dispersants, derived from substituted succinic anhydrides and aromatic polyamines. Methods for making compositions, the methods including contacting a substituted succinic anhydride and an aromatic polyamine. Lubricants that include a composition derived from a substituted succinic anhydride and an aromatic polyamine. Methods for improving soot performance.

7 Claims, No Drawings

DISPERSANTS DERIVED FROM AROMATIC POLYAMINES, LUBRICANTS, AND METHODS

BACKGROUND

Dispersants are well-known and widely-used additives in a number of products, including lubricants, such as engine oil. Engine oils typically are treated with a dispersant in order to reduce or eliminate deposits within an engine. This effect may be achieved by the dispersants' ability to promote the dispersion and/or suspension of soot.

A number of dispersants having excellent soot performance are known, and these dispersants typically are derived from starting materials featuring at least two phenylene moieties bonded to each other via a nitrogen atom, such as those disclosed in U.S. Pat. No. 7,863,338, European Patent Application No. 1574559, and U.S. Pat. No. 7,361,629:

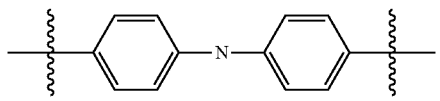

There remains a need, however, for dispersants that (i) can be derived from other starting materials, including starting materials that are readily available and/or less expensive, (ii) perform comparably to, or better than, known dispersants, or (iii) a combination thereof.

BRIEF SUMMARY

Provided herein are compositions, such as dispersants, methods of making compositions, and lubricants that meet one or more of the foregoing needs. For example, the compositions provided herein include dispersants derived from compounds of formula (B):

$$NH_2-R^3-O-R^4-NH_2 \quad \text{formula (B),}$$

wherein $R^3$ and $R^4$, independently, are selected from a $C_1$-$C_{20}$ hydrocarbyl, such as an aryl $C_1$-$C_{20}$ hydrocarbyl.

In one aspect, methods of forming compositions are provided. In some embodiments, the methods include providing a substituted succinic anhydride of formula (A)—

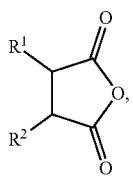

formula (A)

wherein $R^1$ is selected from the group consisting of hydrogen and a $C_1$-$C_{20}$ hydrocarbyl, wherein $R^2$ is a poly-($C_1$-$C_{20}$ hydrocarbyl) having a weight average molecular weight ($M_w$) of about 100 g/mol to about 10,000 g/mol; providing a diamine of formula (B)—

$$NH_2-R^3-O-R^4-NH_2 \quad \text{formula (B),}$$

wherein $R^3$ and $R^4$, independently, are selected from a $C_1$-$C_{20}$ hydrocarbyl, such as an aryl $C_1$-$C_{20}$ hydrocarbyl; and contacting the substituted succinic anhydride of formula (A) and the diamine of formula (B) to form the composition. In some embodiments, the methods include providing a diamine or polyamine of formula (C), wherein $R^7$ is selected from a non-aryl $C_1$-$C_{20}$ hydrocarbyl; and contacting the substituted succinic anhydride of formula (A) and the diamine or polyamine of formula (C)—

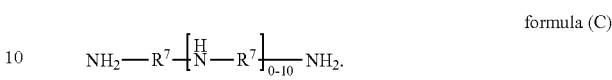

formula (C)

In another aspect, compositions are provided. In some embodiments, the compositions include a compound of formula (I), a compound of formula (II), or a combination thereof:

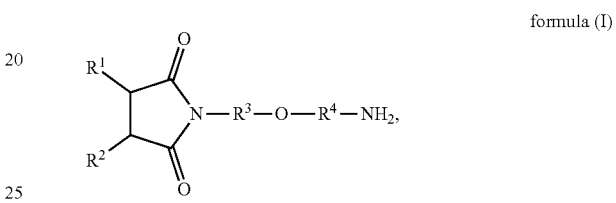

formula (I)

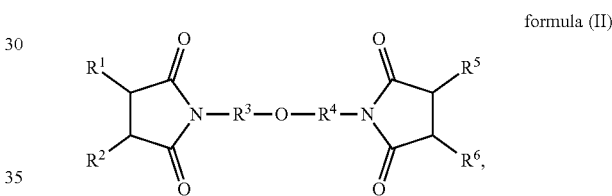

formula (II)

wherein $R^1$ and $R^5$, independently, are selected from the group consisting of hydrogen and a $C_1$-$C_{20}$ hydrocarbyl, wherein $R^2$ and $R^6$, independently, are selected from a poly-($C_1$-$C_{20}$ hydrocarbyl) having a weight average molecular weight ($M_w$) of about 100 g/mol to about 10,000 g/mol; and wherein $R^3$ and $R^4$, independently, are selected from a $C_1$-$C_{20}$ hydrocarbyl, such as an aryl $C_1$-$C_{20}$ hydrocarbyl.

In a still further aspect, lubricants are provided. In some embodiments, the lubricants include a composition described herein, and an oil. The composition may be present in the lubricants at any amount, including an amount effective to achieve a desired effect, such as a desirable soot performance.

In yet another aspect, methods of improving soot performance are provided. In some embodiments, the methods include disposing a composition described herein or a lubricant described herein in an oil of an engine.

Additional aspects will be set forth in part in the description which follows, and in part will be obvious from the description, or may be learned by practice of the aspects described herein. The advantages described herein may be realized and attained by means of the elements and combinations particularly pointed out in the appended claims. It is to be understood that both the foregoing general description and the following detailed description are exemplary and explanatory only and are not restrictive.

DETAILED DESCRIPTION

Provided herein are compositions, methods, and lubricants. The lubricants may include any of the compositions described herein, and the methods may be used to produce any of the compositions described herein.

Compositions

In one aspect, compositions are provided herein. In some embodiments, the compositions include, or consist of, a compound of formula (I). In some embodiments, the compositions include, or consist of, a compound of formula (II). In some embodiments, the compositions include, or consist of, a compound of formula (I) and a compound of formula (II):

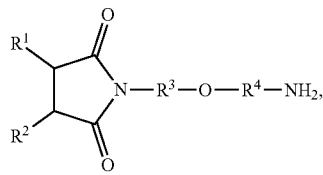

formula (I)

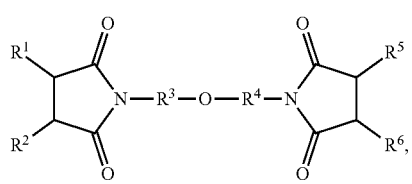

formula (II)

wherein $R^1$ and $R^5$, independently, are selected from the group consisting of hydrogen and a $C_1$-$C_{20}$ hydrocarbyl, wherein $R^2$ and $R^6$, independently, are selected from a poly-($C_1$-$C_{20}$ hydrocarbyl) having a weight average molecular weight ($M_w$) of about 100 g/mol to about 10,000 g/mol; and wherein $R^3$ and $R^4$, independently, are selected from a $C_1$-$C_{20}$ hydrocarbyl, such as an aryl $C_1$-$C_{20}$ hydrocarbyl.

In some embodiments, a ratio of the compound of formula (I) to the compound of formula (II) is about 99:1 to about 1:99.

In some embodiments, a ratio of the compound of formula (I) to the compound of formula (II) is about 90:10 to about 1:99, about 80:20 to about 1:99, about 70:30 to about 1:99, about 60:40 to about 1:99, about 50:50 to about 1:99, about 40:60 to about 1:99, about 30:70 to about 1:99, about 20:80 to about 1:99, about 10:90 to about 1:99, or about 5:95 to about 1:99.

In some embodiments, a ratio of the compound of formula (I) to the compound of formula (II) is about 99:1 to about 10:90, about 99:1 to about 20:80, about 99:1 to about 30:70, about 99:1 to about 40:60, about 99:1 to about 50:50, about 99:1 to about 60:40, about 99:1 to about 70:30, about 99:1 to about 80:20, about 99:1 to about 90:10, or about 99:1 to about 95:5.

In some embodiments, $R^1$ is hydrogen, $R^5$ is hydrogen, or $R^1$ and $R^5$ are hydrogen.

In some embodiments, the weight average molecular weight ($M_w$) of the poly-($C_1$-$C_{20}$ hydrocarbyl) is about 100 g/mol to about 9,000 g/mol, about 100 g/mol to about 8,000 g/mol, about 100 g/mol to about 7,000 g/mol, about 100 g/mol to about 6,000 g/mol, about 100 g/mol to about 5,000 g/mol, about 100 g/mol to about 4,000 g/mol, about 200 g/mol to about 4,000 g/mol, about 300 g/mol to about 5,000 g/mol, about 300 g/mol to about 4,000 g/mol, about 300 g/mol to about 3,000 g/mol, about 300 g/mol to about 2,000 g/mol, or about 300 g/mol to about 1,000 g/mol.

In some embodiments, the poly-($C_1$-$C_{20}$ hydrocarbyl) is a poly-($C_1$-$C_{18}$ hydrocarbyl), a poly-($C_1$-$C_{16}$ hydrocarbyl), a poly-($C_1$-$C_{14}$ hydrocarbyl), a poly-($C_1$-$C_{12}$ hydrocarbyl), a poly-($C_1$-$C_{10}$ hydrocarbyl), a poly-($C_1$-$C_8$ hydrocarbyl), a poly-($C_1$-$C_6$ hydrocarbyl), a poly-($C_2$-$C_6$ hydrocarbyl), a poly-($C_3$-$C_6$ hydrocarbyl), or a poly-($C_3$-$C_5$ hydrocarbyl).

In some embodiments, the poly-($C_1$-$C_{20}$ hydrocarbyl) is a poly-($C_4$ hydrocarbyl), such as polyisobutenyl.

In some embodiments, $R^3$ and $R^4$, independently, are selected from an aryl $C_4$-$C_{20}$ hydrocarbyl, an aryl $C_4$-$C_{18}$ hydrocarbyl, an aryl $C_4$-$C_{16}$ hydrocarbyl, an aryl $C_4$-$C_{14}$ hydrocarbyl, an aryl $C_4$-$C_{12}$ hydrocarbyl, an aryl $C_4$-$C_{10}$ hydrocarbyl, an aryl $C_4$-$C_8$ hydrocarbyl, an aryl $C_4$-$C_6$ hydrocarbyl, or an aryl $C_6$ hydrocarbyl. For example, in some embodiments, $R^3$ and $R^4$ are an unsubstituted aryl $C_6$ hydrocarbyl, e.g., a phenylene, and the compositions provided herein include, or consist of, compounds of formula (Ia) and/or formula (IIa):

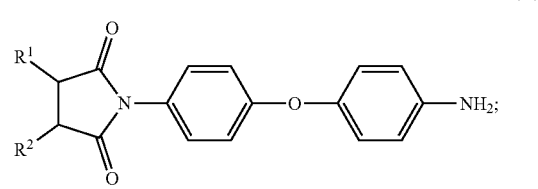

formula (Ia)

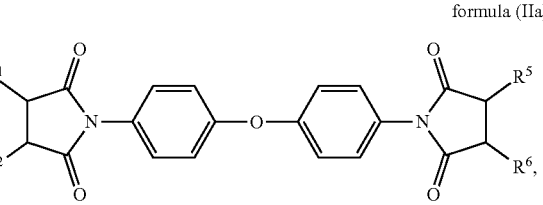

formula (IIa)

wherein $R^1$, $R^2$, $R^5$, and $R^6$ are as defined herein.

In some embodiments, (i) $R^1$ and $R^5$ are hydrogen, (ii) $R^2$ and $R^6$ are polyisobutenyl, (iii) $R^3$ and $R^4$, independently, are selected from the group consisting of phenylene and alkyl-substituted phenylene, (iv) $R^1$ and $R^5$ are hydrogen, and $R^2$ and $R^6$ are polyisobutenyl, (v) $R^1$ and $R^5$ are hydrogen, and $R^3$ and $R^4$, independently, are selected from the group consisting of phenylene and alkyl-substituted phenylene, or (vi) $R^1$ and $R^5$ are hydrogen, $R^2$ and $R^6$ are polyisobutenyl, and $R^3$ and $R^4$, independently, are selected from the group consisting of phenylene and alkyl-substituted phenylene in the compositions of formula (I), formula (II), formula (Ia), and/or formula (IIa).

In some embodiments, the composition also includes a compound of formula (III), a compound of formula (IV), or a combination thereof:

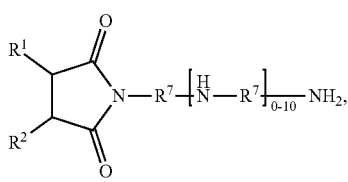

formula (III)

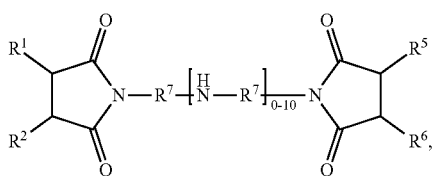

formula (IV)

wherein $R^7$ is selected from a non-aryl $C_1$-$C_{20}$ hydrocarbyl, and $R^1$, $R^2$, $R^5$, and $R^6$ are as defined herein.

In some embodiments, a ratio of the compound of formula (III) to the compound of formula (IV) is about 99:1 to about 1:99.

In some embodiments, a ratio of the compound of formula (III) to the compound of formula (IV) is about 90:10 to about 1:99, about 80:20 to about 1:99, about 70:30 to about 1:99, about 60:40 to about 1:99, about 50:50 to about 1:99, about 40:60 to about 1:99, about 30:70 to about 1:99, about 20:80 to about 1:99, about 10:90 to about 1:99, or about 5:95 to about 1:99.

In some embodiments, a ratio of the compound of formula (III) to the compound of formula (IV) is about 99:1 to about 10:90, about 99:1 to about 20:80, about 99:1 to about 30:70, about 99:1 to about 40:60, about 99:1 to about 50:50, about 99:1 to about 60:40, about 99:1 to about 70:30, about 99:1 to about 80:20, about 99:1 to about 90:10, or about 99:1 to about 95:5.

Lubricants

Also provided herein are lubricants, which may include a composition described herein. In some embodiments, the lubricants include (i) an oil, and (ii) a composition including a compound of formula (I), a compound of formula (II), a compound of formula (Ia), a compound of formula (IIa), or a combination thereof.

A composition including a compound of formula (I), a compound of formula (II), a compound of formula (Ia), a compound of formula (IIa), or a combination thereof may act as a dispersant in the lubricants described herein, but one or more additional or other functions may be served by the composition including a compound of formula (I), formula (Ia), formula (II), formula (IIa), or a combination thereof. The compositions described herein may be present at any desirable amount in the lubricants described herein. In some embodiments, a composition is present in the lubricant at an amount of about 0.02% to about 5%, about 0.05% to about 3%, about 0.1% to about 0.9%, or about 0.1% to about 0.5%, by weight, based on the weight of the lubricant. For example, when a composition includes a compound of formula (I) and a compound of formula (II), and the composition is present in a lubricant at an amount of 0.5% by weight, based on the weight of the lubricant, then the sum of (a) the amount of a compound of formula (I) and (b) the amount of a compound of formula (II) constitutes 0.5%, by weight, of the lubricant.

Methods

Also provided herein are methods of forming compositions, such as the compositions that include the compound(s) of formula (I), formula (Ia), formula (II), formula (IIa), and combinations thereof.

In some embodiments, the methods include providing a substituted succinic anhydride of formula (A)—

formula (A)

wherein $R^1$ and $R^2$ are as defined herein; providing a diamine of formula (B)—

$$NH_2—R^3—O—R^4—NH_2 \qquad \text{formula (B)},$$

wherein $R^3$ and $R^4$ are as defined herein; and contacting the substituted succinic anhydride of formula (A) and the diamine of formula (B) to form the composition.

In some embodiments, the methods also include providing a diamine or polyamine of formula (C)—

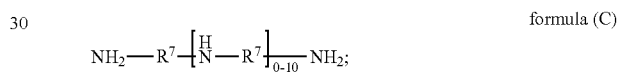

formula (C)

wherein $R^7$ is selected from a non-aryl $C_1$-$C_{20}$ hydrocarbyl; and contacting the substituted succinic anhydride of formula (A) and the diamine or polyamine of formula (C).

A substituted succinic anhydride of formula (A) may be contacted with a diamine of formula (B) and a diamine or polyamine of formula (C) in any manner. For example, a substituted succinic anhydride of formula (A) may be contacted with a diamine of formula (B) and a diamine or polyamine of formula (C) sequentially (in any order), simultaneously, or a combination thereof. In some embodiments, a substituted succinic anhydride of formula (A) is contacted with an amount of a diamine of formula (B) and an amount of a diamine or polyamine of formula (C), and the ratio of the amount of the diamine of formula (B) to the amount of the diamine or polyamine of formula (C) is about 90:10 to about 1:99, about 80:20 to about 1:99, about 70:30 to about 1:99, about 60:40 to about 1:99, about 50:50 to about 1:99, about 40:60 to about 1:99, about 30:70 to about 1:99, about 20:80 to about 1:99, about 10:90 to about 1:99, about 5:95 to about 1:99, about 99:1 to about 10:90, about 99:1 to about 20:80, about 99:1 to about 30:70, about 99:1 to about 40:60, about 99:1 to about 50:50, about 99:1 to about 60:40, about 99:1 to about 70:30, about 99:1 to about 80:20, about 99:1 to about 90:10, or about 99:1 to about 95:5.

A substituted succinic anhydride of formula (A) and a diamine of formula (B) may be dispersed in a liquid, such as a base oil, prior to and/or during the contacting. If present, a diamine or polyamine of formula (C) may be dispersed in a liquid, such as a base oil, prior to and/or during the contacting of the diamine or polyamine of formula (C) and the substituted succinic anhydride of formula (A). For example, a substituted succinic anhydride of formula (A) may be dispersed in a base oil, and then a diamine of formula (B), or a diamine of formula (B) and a diamine or polyamine of formula (C) may be added to the mixture including the base oil and the substituted succinic anhydride of formula (A).

A substituted succinic anhydride of formula (A) may be contacted with any amount of a diamine of formula (B), or vice versa. For example, a substituted succinic anhydride of formula (A) may be contacted with an amount of a diamine of formula (B) effective to form a composition that includes a desired ratio of compounds of formula (I) and formula (II). Similarly, a substituted succinic anhydride of formula (B) may be contacted with any amount of a diamine or polyamine of formula (C), or vice versa.

In some embodiments, the diamine, such as the diamine of formula (B), is of formula (D):

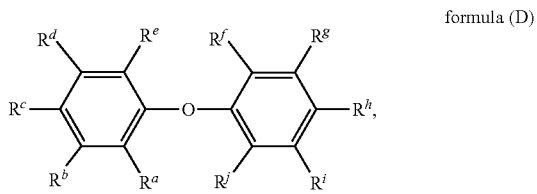

formula (D)

wherein $R^a$-$R^j$, independently, are selected from the group consisting of hydrogen, —NH$_2$, and a C$_1$-C$_{20}$ hydrocarbyl, wherein (i) at least one of $R^a$-$R^e$ and (ii) at least one of $R^f$-$R^j$ is —NH$_2$.

In some embodiments, the diamine is of formula (D), wherein $R^c$ and $R^h$ are —NH$_2$. In some embodiments, the diamine is of formula (D), wherein $R^c$ and $R^h$ are —NH$_2$, and $R^a$, $R^b$, $R^d$, $R^e$, $R^f$, $R^g$, $R^i$, and $R^j$ are hydrogen.

A substituted succinic anhydride of formula (A) and a diamine (e.g., a diamine of formula (B), or a diamine of formula (B) and a diamine or polyamine of formula (C)) may be contacted at any temperature and/or pressure. For example, a substituted succinic anhydride of formula (A) and a diamine of formula (B) may be contacted at a temperature of about 80° C. to about 180° C., or about 100° C. to about 150° C.

The phrases "C$_1$-C$_{20}$ hydrocarbyl", "C$_1$-C$_6$ hydrocarbyl", and the like, as used herein, generally refer to aliphatic, aryl, or arylalkyl groups containing 1 to 20 carbon atoms, 1 to 6 carbon atoms, and the like, including substituted derivatives thereof. The phrase "non-aryl C$_1$-C$_{20}$ hydrocarbyl" and the like, as used herein, generally refer to aliphatic groups, which lack an aryl moiety, and contain 1 to 20 carbon atoms, and the like. Examples of aliphatic groups, in each instance, include, but are not limited to, an alkyl group, a cycloalkyl group, an alkenyl group, a cycloalkenyl group, an alkynyl group, an alkadienyl group, a cyclic group, and the like, and includes all substituted, unsubstituted, branched, and linear analogs or derivatives thereof, in each instance having 1 to 20 carbon atoms, 1 to 6 carbon atoms, or the like. Examples of alkyl groups include, but are not limited to, methyl, ethyl, propyl, isopropyl, n-butyl, t-butyl, isobutyl, pentyl, hexyl, isohexyl, heptyl, 4,4-dimethylpentyl, octyl, 2,2,4-trimethylpentyl, nonyl, decyl, undecyl and dodecyl. Cycloalkyl moieties may be monocyclic or multicyclic, and examples include cyclopropyl, cyclobutyl, cyclopentyl, cyclohexyl, and adamantyl. Additional examples of alkyl moieties have linear, branched and/or cyclic portions (e.g., 1-ethyl-4-methyl-cyclohexyl). Representative alkenyl moieties include vinyl, allyl, 1-butenyl, 2-butenyl, isobutylenyl, 1-pentenyl, 2-pentenyl, 3-methyl-1-butenyl, 2-methyl-2-butenyl, 2,3-dimethyl-2-butenyl, 1-hexenyl, 2-hexenyl, 3-hexenyl, 1-heptenyl, 2-heptenyl, 3-heptenyl, 1-octenyl, 2-octenyl, 3-octenyl, 1-nonenyl, 2-nonenyl, 3-nonenyl, 1-decenyl, 2-decenyl and 3-decenyl. Representative alkynyl moieties include acetylenyl, propynyl, 1-butynyl, 2-butynyl, 1-pentynyl, 2-pentynyl, 3-methyl-1-butynyl, 4-pentynyl, 1-hexynyl, 2-hexynyl, 5-hexynyl, 1-heptynyl, 2-heptynyl, 6-heptynyl, 1-octynyl, 2-octynyl, 7-octynyl, 1-nonynyl, 2-nonynyl, 8-nonynyl, 1-decynyl, 2-decynyl and 9-decynyl. Examples of aryl or arylalkyl moieties include, but are not limited to, anthracenyl, azulenyl, biphenyl, fluorenyl, indan, indenyl, naphthyl, phenanthrenyl, phenyl, 1,2,3,4-tetrahydro-naphthalene, anthracenyl, tolyl, xylyl, mesityl, benzyl, and the like, including any heteroatom substituted derivative thereof.

The valency of each hydrocarbyl, e.g., each C$_1$-C$_{20}$ hydrocarbyl, is determined by the formulas depicted herein. For example, when R$^1$ of formula (I) is a C$_1$-C$_{20}$ hydrocarbyl, the C$_1$-C$_{20}$ hydrocarbyl may be a monovalent C$_1$-C$_{20}$ hydrocarbyl bonded to the indicated carbon atom of the 5-membered ring. As a further example, when R$^4$ of formula (B) is a C$_1$-C$_{20}$ hydrocarbyl, the C$_1$-C$_{20}$ hydrocarbyl is a multivalent C$_1$-C$_{20}$ hydrocarbyl bonded to the central oxygen atom and the terminal amine.

When two or more elements are selected "independently" from one or more options, the options selected for the two or more elements may be the same or different. For example, when "R$^3$ and R$^4$, independently, are selected from a C$_1$-C$_{20}$ hydrocarbyl", then (i) the same C$_1$-C$_{20}$ hydrocarbyl may be selected for both R$_3$ and R$_4$, or (ii) a different C$_1$-C$_{20}$ hydrocarbyl may be selected for each of R$_3$ and R$_4$.

Unless otherwise indicated, the term "substituted," when used to describe a chemical structure or moiety, refers to a derivative of that structure or moiety wherein (i) a multivalent non-carbon atom (e.g., oxygen, nitrogen, sulfur, phosphorus, etc.) is bonded to one or more carbon atoms of the chemical structure or moiety (e.g., a "substituted" C$_4$ hydrocarbyl may include, but is not limited to, diethyl ether moiety, a methyl propionate moiety, an N,N-dimethylacetamide moiety, a butoxy moiety, etc., and a "substituted" aryl C$_{12}$ hydrocarbyl may include, but is not limited to, an oxydibenzene moiety, a benzophenone moiety, etc.) or (ii) one or more of its hydrogen atoms (e.g., chlorobenzene may be characterized generally as an aryl C$_6$ hydrocarbyl "substituted" with a chlorine atom, and "substituted" divalent aryl C$_6$ hydrocarbyl may include an alkyl-substituted phenylene) is replaced with a chemical moiety or functional group, such as alcohol, alkoxy, alkanoyloxy, alkoxycarbonyl, alkenyl, alkyl (e.g., methyl, ethyl, propyl, t-butyl), alkynyl, alkylcarbonyloxy (—OC(O)alkyl), amide (—C(O)NH-alkyl- or -alkylNHC(O)alkyl), tertiary amine (such as alkylamino, arylamino, arylalkylamino), aryl, aryloxy, azo, carbamoyl (—NHC(O)O-alkyl- or —OC(O)NH-alkyl), carbamyl (e.g., CONH$_2$, as well as CONH-alkyl, CONH-aryl, and CONH-arylalkyl), carboxyl, carboxylic acid, cyano, ester, ether (e.g., methoxy, ethoxy), halo, haloalkyl (e.g., —CCl$_3$, —CF$_3$, —C(CF$_3$)$_3$), heteroalkyl, isocyanate, isothiocyanate, nitrile, nitro, oxo, phosphodiester, sulfide, sulfonamido (e.g., SO$_2$NH$_2$), sulfone, sulfonyl (including alkylsulfonyl, arylsulfonyl and arylalkylsulfonyl), sulfoxide, thiol (e.g., sulfhydryl, thioether) or urea (—NHCONH-alkyl-). When a hydrocarbyl is substituted with a chemical moiety or functional group including one or more carbon atoms, the one or more carbon atoms of the chemical moiety or functional group count towards the total number of carbon atoms (e.g., a methyl-substituted phenylene is a divalent aryl C$_7$ hydrocarbyl).

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of various embodiments, applicants in no way disclaim these technical aspects, and it is contemplated that the present disclosure may encompass one or more of the conventional technical aspects discussed herein.

The present disclosure may address one or more of the problems and deficiencies of known methods and processes. However, it is contemplated that various embodiments may prove useful in addressing other problems and deficiencies in a number of technical areas. Therefore, the present disclosure should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

In the descriptions provided herein, the terms "includes," "is," "containing," "having," and "comprises" are used in an open-ended fashion, and thus should be interpreted to mean "including, but not limited to." When compositions of matter, lubricants, or methods are claimed or described in terms of "comprising" various elements or components, the compositions, lubricants, or methods can also "consist essentially of" or "consist of" the various elements or components, unless stated otherwise.

The terms "a," "an," and "the" are intended to include plural alternatives, e.g., at least one. For instance, the disclosure of "a substituted succinic anhydride", "a diamine", "a first diamine", "a second diamine", and the like, is meant to encompass one, or mixtures or combinations of more than one substituted succinic anhydride, diamine, first diamine, second diamine, and the like, unless otherwise specified.

Various numerical ranges may be disclosed herein. When Applicant discloses or claims a range of any type, Applicant's intent is to disclose or claim individually each possible number that such a range could reasonably encompass, including end points of the range as well as any sub-ranges and combinations of sub-ranges encompassed therein, unless otherwise specified. Moreover, all numerical end points of ranges disclosed herein are approximate. As a representative example, Applicant discloses, in some embodiments, that a substituted succinic anhydride of formula (A) and/or a diamine of formula (B) may be contacted at a temperature of about 100° C. to about 120° C. This range should be interpreted as encompassing about 100° C. and about 120° C., and further encompasses "about" each of 101° C., 102° C., 103° C., 104° C., 105° C., 106° C., 107° C., 108° C., 109° C., 110° C., 111° C., 112° C., 113° C., 114° C., 115° C., 116° C., 117° C., 118° C., and 119° C., including any ranges and sub-ranges between any of these values.

As used herein, the term "about" means plus or minus 10% of the numerical value of the number with which it is being used.

Embodiments

The following listing includes embodiments of the methods, compositions, and lubricants described herein:

Embodiment 1. A method of forming a composition, the method comprising providing a substituted succinic anhydride of formula (A)—

formula (A)

wherein $R^1$ is selected from the group consisting of hydrogen and a $C_1$-$C_{20}$ hydrocarbyl, wherein $R^2$ is a poly-($C_1$-$C_{20}$ hydrocarbyl) having a weight average molecular weight of about 100 g/mol to about 10,000 g/mol; providing a first diamine of formula (B)—

$$NH_2-R^3-O-R_4-NH_2 \qquad \text{formula (B),}$$

wherein $R^3$ and $R^4$, independently, are selected from an aryl $C_1$-$C_{20}$ hydrocarbyl; and contacting the substituted succinic anhydride of formula (A) and the first diamine of formula (B) to form the composition.

Embodiment 2. The method of Embodiment 1, wherein $R^1$ is hydrogen.

Embodiment 3. The method of Embodiment 1 or 2, wherein the weight average molecular weight ($M_w$) of the poly-($C_1$-$C_{20}$ hydrocarbyl) is about 100 g/mol to about 9,000 g/mol, about 100 g/mol to about 8,000 g/mol, about 100 g/mol to about 7,000 g/mol, about 100 g/mol to about 6,000 g/mol, about 100 g/mol to about 5,000 g/mol, about 100 g/mol to about 4,000 g/mol, about 200 g/mol to about 4,000 g/mol, about 300 g/mol to about 5,000 g/mol, about 300 g/mol to about 4,000 g/mol, about 300 g/mol to about 3,000 g/mol, about 300 g/mol to about 2,000 g/mol, or about 300 g/mol to about 1,000 g/mol.

Embodiment 4. The method of any one of Embodiments 1 to 3, wherein the poly-($C_1$-$C_{20}$ hydrocarbyl) is a poly-($C_1$-$C_{18}$ hydrocarbyl), a poly-($C_1$-$C_{16}$ hydrocarbyl), a poly-($C_1$-$C_{14}$ hydrocarbyl), a poly-($C_1$-$C_{12}$ hydrocarbyl), a poly-($C_1$-$C_{10}$ hydrocarbyl), a poly-($C_1$-$C_8$ hydrocarbyl), a poly-($C_1$-$C_6$ hydrocarbyl), a poly-($C_2$-$C_6$ hydrocarbyl), a poly-($C_3$-$C_6$ hydrocarbyl), or a poly-($C_3$-$C_5$ hydrocarbyl).

Embodiment 5. The method of any one of Embodiments 1 to 4, wherein the poly-($C_1$-$C_{20}$ hydrocarbyl) is polyisobutenyl.

Embodiment 6. The method of any one of Embodiments 1 to 5, wherein $R^3$ and $R^4$, independently, are selected from an aryl $C_4$-$C_{20}$ hydrocarbyl, an aryl $C_4$-$C_{18}$ hydrocarbyl, an aryl $C_4$-$C_{16}$ hydrocarbyl, an aryl $C_4$-$C_{14}$ hydrocarbyl, an aryl $C_4$-$C_{12}$ hydrocarbyl, an aryl $C_4$-$C_{10}$ hydrocarbyl, an aryl $C_4$-$C_8$ hydrocarbyl, an aryl $C_4$-$C_6$ hydrocarbyl, or an aryl $C_6$ hydrocarbyl.

Embodiment 7. The method of any one of Embodiments 1 to 6, wherein the first diamine is of formula (D):

formula (D)

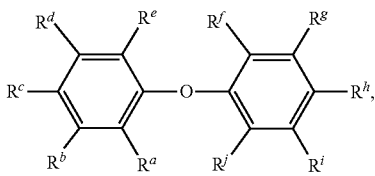

wherein $R^a$-$R^j$, independently, are selected from the group consisting of hydrogen, —NH$_2$, and a C$_1$-C$_{20}$ hydrocarbyl, wherein (i) at least one of $R^a$-$R^e$ and (ii) at least one of $R^f$-$R^j$ is —NH$_2$.

Embodiment 8. The method of Embodiment 7, wherein the diamine is of formula (D), wherein $R^c$ and $R^h$ are —NH$_2$.

Embodiment 9. The method of Embodiment 7, wherein the diamine is of formula (D), wherein $R^c$ and $R^h$ are —NH$_2$, and $R^a$, $R^b$, $R^d$, $R^e$, $R^f$, $R^g$, $R^j$, and $R^i$ are hydrogen.

Embodiment 10. The method of any one of Embodiments 1 to 9, wherein the substituted succinic anhydride of formula (A) and the first diamine of formula (B) are contacted at a temperature of about 80° C. to about 180° C., or about 100° C. to about 150° C.

Embodiment 11. The method of any one of Embodiments 1 to 10, further comprising providing a second diamine or polyamine of formula (C)— formula (C)

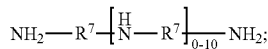

wherein $R^7$ is selected from a non-aryl C$_1$-C$_{20}$ hydrocarbyl; and contacting the substituted succinic anhydride of formula (A) and the second diamine or polyamine of formula (C).

Embodiment 12. The method of any one of Embodiments 1 to 11, wherein the substituted succinic anhydride of formula (A) is contacted with (i) a first diamine of formula (B), or (ii) a first diamine of formula (B) and a second diamine or polyamine of formula (C) sequentially (in any order), simultaneously, or a combination thereof.

Embodiment 13. The method of any one of Embodiments 1 to 12, wherein the substituted succinic anhydride of formula (A) is contacted with an amount of the first diamine of formula (B) and an amount of the second diamine or polyamine of formula (C), and the ratio of the amount of the first diamine of formula (B) to the amount of the second diamine or polyamine of formula (C) is about 90:10 to about 1:99, about 80:20 to about 1:99, about 70:30 to about 1:99, about 60:40 to about 1:99, about 50:50 to about 1:99, about 40:60 to about 1:99, about 30:70 to about 1:99, about 20:80 to about 1:99, about 10:90 to about 1:99, about 5:95 to about 1:99, about 99:1 to about 10:90, about 99:1 to about 20:80, about 99:1 to about 30:70, about 99:1 to about 40:60, about 99:1 to about 50:50, about 99:1 to about 60:40, about 99:1 to about 70:30, about 99:1 to about 80:20, about 99:1 to about 90:10, or about 99:1 to about 95:5.

Embodiment 14. The method of any one of Embodiments 1 to 13, wherein the substituted succinic anhydride of formula (A) and (i) the first diamine of formula (B), or (ii) the first diamine of formula (B) and the second diamine or polyamine of formula (C) is dispersed in a liquid, such as a base oil, prior to and/or during the contacting.

Embodiment 15. The method of any one of Embodiments 1 to 14, wherein the substituted succinic anhydride of formula (A) is dispersed in a base oil, and then the first diamine of formula (B) is added to the mixture including the base oil and the substituted succinic anhydride of formula (A).

Embodiment 16. A composition comprising a compound of formula (I), a compound of formula (II), or a combination thereof:

formula (I)

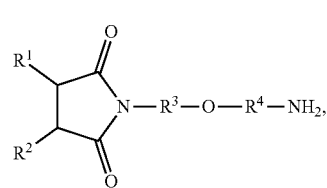

formula (II)

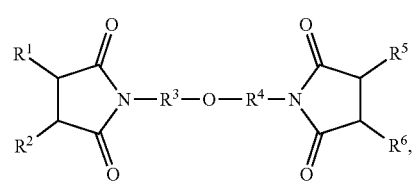

wherein $R^1$ and $R^5$, independently, are selected from the group consisting of hydrogen and a C$_1$-C$_{20}$ hydrocarbyl, wherein $R^2$ and $R^6$, independently, are selected from a poly-(C$_1$-C$_{20}$ hydrocarbyl) having a weight average molecular weight of about 100 g/mol to about 10,000 g/mol; and wherein $R^3$ and $R^4$, independently, are selected from an aryl C$_1$-C$_{20}$ hydrocarbyl; and wherein, optionally, the composition further comprises a compound of formula (III), a compound of formula (IV), or a combination thereof:

formula (III)

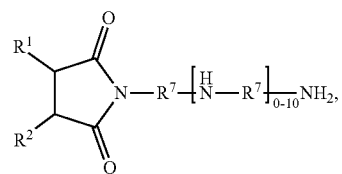

formula (IV)

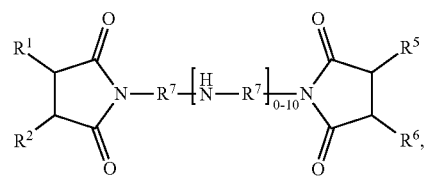

wherein $R^7$ is selected from a non-aryl C$_1$-C$_{20}$ hydrocarbyl.

Embodiment 17. The composition of Embodiment 16, wherein the composition is made according to any one of the methods of Embodiments 1 to 15.

Embodiment 18. The composition of Embodiment 16 or 17, wherein the composition includes, or consists of, a compound of formula (I).

Embodiment 19. The composition of Embodiment 16 or 17, wherein the composition includes, or consists of, a compound of formula (II).

Embodiment 20. The composition of Embodiment 16 or 17, wherein the composition includes, or consists of, a compound of formula (I) and a compound of formula (II).

Embodiment 21. The composition of Embodiment 20, wherein a ratio of the compound of formula (I) to the compound of formula (II) is about 99:1 to about 1:99.

Embodiment 22. The composition of Embodiment 20, wherein a ratio of the compound of formula (I) to the compound of formula (II) is about 90:10 to about 1:99, about 80:20 to about 1:99, about 70:30 to about 1:99, about 60:40 to about 1:99, about 50:50 to about 1:99, about 40:60 to about 1:99, about 30:70 to about 1:99, about 20:80 to about 1:99, about 10:90 to about 1:99, or about 5:95 to about 1:99.

Embodiment 23. The composition of Embodiment 20, wherein a ratio of the compound of formula (I) to the compound of formula (II) is about 99:1 to about 10:90, about 99:1 to about 20:80, about 99:1 to about 30:70, about 99:1 to about 40:60, about 99:1 to about 50:50, about 99:1 to about 60:40, about 99:1 to about 70:30, about 99:1 to about 80:20, about 99:1 to about 90:10, or about 99:1 to about 95:5.

Embodiment 24. The composition of any one of Embodiments 16 to 23, wherein $R^1$ is hydrogen, $R^5$ is hydrogen, or $R^1$ and $R^5$ are hydrogen.

Embodiment 25. The composition of any one of Embodiments 16 to 24, wherein the weight average molecular weight ($M_w$) of the poly-($C_1$-$C_{20}$ hydrocarbyl) is about 100 g/mol to about 9,000 g/mol, about 100 g/mol to about 8,000 g/mol, about 100 g/mol to about 7,000 g/mol, about 100 g/mol to about 6,000 g/mol, about 100 g/mol to about 5,000 g/mol, about 100 g/mol to about 4,000 g/mol, about 200 g/mol to about 4,000 g/mol, about 300 g/mol to about 5,000 g/mol, about 300 g/mol to about 4,000 g/mol, about 300 g/mol to about 3,000 g/mol, about 300 g/mol to about 2,000 g/mol, or about 300 g/mol to about 1,000 g/mol.

Embodiment 26. The composition of any one of Embodiments 16 to 25, wherein the poly-($C_1$-$C_{20}$ hydrocarbyl) is a poly-($C_1$-$C_{18}$ hydrocarbyl), a poly-($C_1$-$C_{16}$ hydrocarbyl), a poly-($C_1$-$C_{14}$ hydrocarbyl), a poly-($C_1$-$C_{12}$ hydrocarbyl), a poly-($C_1$-$C_{10}$ hydrocarbyl), a poly-($C_1$-$C_8$ hydrocarbyl), a poly-($C_1$-$C_6$ hydrocarbyl), a poly-($C_2$-$C_6$ hydrocarbyl), a poly-($C_3$-$C_6$ hydrocarbyl), or a poly-($C_3$-$C_5$ hydrocarbyl).

Embodiment 27. The composition of any one of Embodiments 16 to 26, wherein the poly-($C_1$-$C_{20}$ hydrocarbyl) is polyisobutenyl.

Embodiment 28. The composition of any one of Embodiments 16 to 27, wherein $R^3$ and $R^4$, independently, are selected from an aryl $C_4$-$C_{20}$ hydrocarbyl, an aryl $C_4$-$C_{18}$ hydrocarbyl, an aryl $C_4$-$C_{16}$ hydrocarbyl, an aryl $C_4$-$C_{14}$ hydrocarbyl, an aryl $C_4$-$C_{12}$ hydrocarbyl, an aryl $C_4$-$C_{10}$ hydrocarbyl, an aryl $C_4$-$C_8$ hydrocarbyl, an aryl $C_4$-$C_6$ hydrocarbyl, or an aryl $C_6$ hydrocarbyl.

Embodiment 29. The composition of any one of Embodiments 16 to 28, wherein $R^1$ and $R^5$ are hydrogen, $R^2$ and $R^6$ are polyisobutenyl, and $R^3$ and $R^4$, independently, are selected from the group consisting of phenylene and alkyl-substituted phenylene.

Embodiment 30. The composition of any one of Embodiments 16 to 29, wherein $R^3$ and $R^4$ are an unsubstituted aryl $C_6$ hydrocarbyl, e.g., a phenylene, and the compositions include, or consist of, a compounds of formula (Ia), a compound of formula (IIa), or a combination thereof:

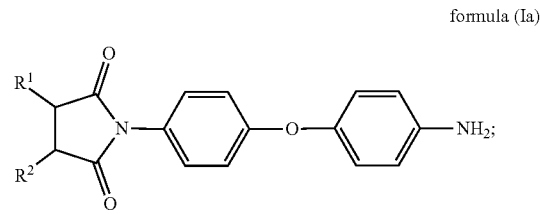

formula (Ia)

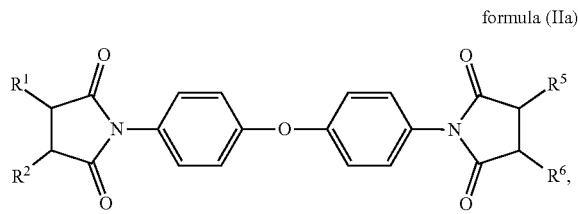

formula (IIa)

wherein $R^1$, $R^2$, $R^5$, and $R^6$ are as in any of the preceding embodiments.

Embodiment 31. The composition of any one of Embodiments 16 to 30, wherein (i) $R^1$ and $R^5$ are hydrogen, (ii) $R^2$ and $R^6$ are polyisobutenyl, (iii) $R^3$ and $R^4$, independently, are selected from the group consisting of phenylene and alkyl-substituted phenylene, (iv) $R^1$ and $R^5$ are hydrogen, and $R^2$ and $R^6$ are polyisobutenyl, (v) $R^1$ and $R^5$ are hydrogen, and $R^3$ and $R^4$, independently, are selected from the group consisting of phenylene and alkyl-substituted phenylene, or (vi) $R^1$ and $R^5$ are hydrogen, $R^2$ and $R^6$ are polyisobutenyl, and $R^3$ and $R^4$, independently, are selected from the group consisting of phenylene and alkyl-substituted phenylene in the compositions of formula (I), formula (II), formula (Ia), and/or formula (IIa).

Embodiment 32. A lubricant comprising the composition of any one of Embodiments 16 to 31; and an oil.

Embodiment 33. The lubricant of Embodiment 32, wherein the composition of any one of Embodiments 16 to 31 is present in the lubricant at an amount of about 0.02% to about 5%, about 0.05% to about 3%, about 0.1% to about 0.9%, or about 0.1% to about 0.5%, by weight, based on the weight of the lubricant.

Embodiment 34. A method of improving soot performance, the method comprising disposing the composition or lubricant of any one of the preceding Embodiments in an oil of an engine.

EXAMPLES

The present invention is further illustrated by the following examples, which are not to be construed in any way as imposing limitations upon the scope thereof. On the contrary, it is to be clearly understood that resort may be had to various other aspects, embodiments, modifications, and equivalents thereof which, after reading the description herein, may suggest themselves to one of ordinary skill in the art without departing from the spirit of the present invention or the scope of the appended claims. Thus, other aspects of this invention will be apparent to those skilled in the art from consideration of the specification and practice of the invention disclosed herein.

Example 1—Preparation of an Embodiment of a Dispersant

In this example, an embodiment of a dispersant described herein was produced. The process of this example used a polyisobutenyl succinic anhydride (PIBSA) prepared with polyisobutenyl having a molecular weight ($M_w$) of 950 g/mol. Therefore, the PIBSA of this example is referred to as "PIBSA 950". Although PIBSA 950 is used in this example, the PIBSA 950 may be substituted or supplemented with other compounds of formula (A).

The process of this example also used a base oil. The base oil used in this example was PRIMA® 100 based oil (Saudi Aramco, Dhahran, Saudi Arabia), but other base oils, including commercially available base oils, may be used instead of, or in addition to, PRIMA® 100 base oil.

PIBSA 950 (27.0 g) and PRIMA® 100 base oil (20.0 g) were mixed, and heated to a temperature of about 100° C. to about 120° C., while sparging with nitrogen.

To the mixture of PIBSA 950 and PRIMA® 100 base oil, oxydianiline (4.1 g) was added over a 30 minute period. Although oxydianiline was used in this Example, other compounds of formula (B) may be used in the process of this example instead of, or in addition to, oxydianiline.

After the addition of oxydianiline, the resulting mixture was heated to a temperature of about 120° C. to about 140° C., and the temperature was maintained for 2 hours.

A sample was then taken, the infrared spectroscopy (IR) was performed to confirm the substantial absence of the peak corresponding to the carbonyl moieties of PIBSA 950.

The product was then filtered through a filter (40 micron), and tested as described in the following Example.

Example 2—Soot Performance of an Embodiment of a Dispersant

The soot performance of the embodiment of a dispersant produced by the procedure of Example 1 was evaluated by performing Brookfield viscosity testing and four-ball wear testing. VULCAN® VXC72R carbon black (Cabot Corporation, USA) was used for all tests of this example.

The results of the Brookfield viscosity testing of this example are provided at the following table:

| Sample | Brookfield Viscosity at 25° C., cP | Factor Increase |
|---|---|---|
| Comparative Composition 1 - Engine Oil top treated with 0.9 wt % dispersant* | 330 | 2.8 |
| Comparative Composition 2 - Engine Oil top treated with 0.9 wt % dispersant* and 5 wt % carbon black | 910 | |
| Inventive Composition 1 - Engine Oil top treated with 0.9 wt % of the product of Example 1 | 476 | 1.8 |
| Inventive Composition 2 - Engine Oil top treated with 0.9 wt % of the product of Example 1 and 5 wt % carbon black | 844 | |

*Comparative Compositions 1 and 2 included a dispersant produced by contacting PIBSA and mixed polyethylene polyamines; the dispersant of Comparative Compositions 1 and 2 had a nitrogen content comparative to the nitrogen content of the product of Example 1.

The results of the four-ball wear test are provided at the following table. The following test conditions were used in this example: 1450 RPM, 30 minutes, 15 kg, and 25° C.

| Sample | Wear Scar Size, mm | Wear Scar Increase, % |
|---|---|---|
| Comparative Composition 1 - Engine Oil top treated with 0.9 wt % dispersant* | 0.251 | 58.2 |
| Comparative Composition 2 - Engine Oil top treated with 0.9 wt % dispersant and 5 wt % carbon black | 0.397 | |
| Inventive Composition 1 - Engine Oil top treated with 0.9 wt % of the product of Example 1 | 0.245 | 27.3 |
| Inventive Composition 2 - Engine Oil top treated with 0.9 wt % of the product of Example 1 and 5 wt % carbon black | 0.312 | |

*Comparative Compositions 1 and 2 included a dispersant produced by contacting PIBSA and mixed polyethylene polyamines; the dispersant of Comparative Compositions 1 and 2 had a nitrogen content comparative to the nitrogen content of the product of Example 1.

The results of both of these tests revealed that the product of Example 1 outperformed the dispersant used in Comparative Compositions 1 and 2 to a surprising and unexpected extent.

We claim:

1. A composition comprising a compound of formula (I) and a compound of formula (II):

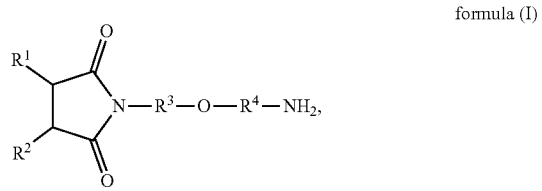

formula (I)

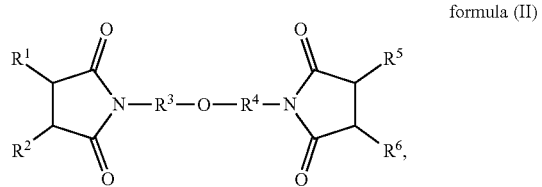

formula (II)

wherein $R^1$ and $R^5$, independently, are selected from the group consisting of hydrogen and a $C_1$-$C_{20}$ hydrocarbyl, wherein $R^2$ and $R^6$, independently, are selected from a poly-($C_1$-$C_{20}$ hydrocarbyl) having a weight average molecular weight of about 700 g/mol to about 2,500 g/mol, wherein the poly-($C_1$-$C_{20}$ hydrocarbyl) is polyisobutenyl;

wherein $R^3$ and $R^4$, independently, are selected from an aryl $C_1$-$C_{20}$ hydrocarbyl, and wherein a mole ratio of the compound of formula (I) to the compound of formula (II) is about 70:30 to about 99:1.

2. The composition of claim 1, wherein $R^3$ and $R^4$, independently, are selected from an aryl $C_4$-$C_{20}$ hydrocarbyl.

3. The composition of claim 1, wherein—

$R^1$ and $R^5$ are hydrogen, and $R^3$ and $R^4$, independently, are selected from the group consisting of phenylene and alkyl-substituted phenylene.

4. The composition of claim 1, further comprising a compound of formula (III), a compound of formula (IV), or a combination thereof:

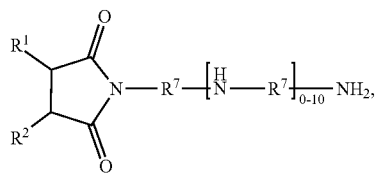

formula (III)

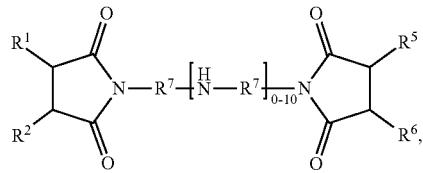

formula (IV)

wherein $R^7$ is selected from a non-aryl $C_1$-$C_{20}$ hydrocarbyl.

5. A lubricant comprising:

the composition of claim 1; and an oil.

6. The lubricant of claim 5, wherein the composition is present in the lubricant at an amount of about 0.02% to about 5%, by weight, based on the weight of the lubricant.

7. A method of improving soot performance, the method comprising:

disposing the composition of claim 1 in an engine oil.

* * * * *